US007864843B2

(12) United States Patent
Choo et al.

(10) Patent No.: US 7,864,843 B2
(45) Date of Patent: Jan. 4, 2011

(54) METHOD AND APPARATUS TO ENCODE AND/OR DECODE SIGNAL USING BANDWIDTH EXTENSION TECHNOLOGY

(75) Inventors: Ki-hyun Choo, Yongin-si (KR); Jung-hoe Kim, Yongin-si (KR); Eun-mi Oh, Yongin-si (KR); Miao Lei, Yongin-si (KR); Chang-yong Son, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 791 days.

(21) Appl. No.: 11/757,528

(22) Filed: Jun. 4, 2007

(65) Prior Publication Data

US 2007/0282599 A1 Dec. 6, 2007

(30) Foreign Application Priority Data

Jun. 3, 2006 (KR) ...................... 10-2006-0050124
May 22, 2007 (KR) ...................... 10-2007-0049947

(51) Int. Cl.
*H04N 11/02* (2006.01)
*G10L 13/00* (2006.01)

(52) U.S. Cl. .................................. 375/240.12; 704/264

(58) Field of Classification Search ................. 375/240, 375/241, 242, 240.12; 704/203, 205, 211, 704/219–220, 500, 258, 262, 264
See application file for complete search history.

(56) References Cited

U.S. PATENT DOCUMENTS 5,455,888 A 10/1995 Iyengar et al.
5,890,108 A * 3/1999 Yeldener .................... 704/208
5,950,153 A 9/1999 Ohmori
5,999,897 A * 12/1999 Yeldener .................... 704/207
2005/0004803 A1 1/2005 Smeets et al.
2007/0225971 A1* 9/2007 Bessette ..................... 704/203
2007/0299656 A1* 12/2007 Son et al. .................... 704/205
2008/0120117 A1* 5/2008 Choo et al. ................. 704/500

OTHER PUBLICATIONS

International Search Report issued Aug. 17, 2007 in International Korean Application No. PCT/KR2007/002672.

Qian, Y. et. al. 'Combining Equalization and Estimation for Bandwidth Extension of Narrowband Speech' In: Proceedings of the 2004 IEEE International Conference on Acoustics, Speech, and Signal Processing. IEEE, May 17, 2004, vol. I, pp. 1-713-716.

Valin, J.M. et al. 'Bandwidth Extension of Narrowband Speech for Low Bit-Rate Wideband Coding' In: Proceedings of the 2000 IEEE Workshop On Speeh Coding. IEEE, Sep. 17, 2000, pp. 130-132.

* cited by examiner

*Primary Examiner*—Khanh C Tran
(74) *Attorney, Agent, or Firm*—Stanzione & Kim, LLP

(57) ABSTRACT

A method and apparatus to perform bandwidth extension encoding and decoding encodes and/or decodes a high frequency signal using an excitation signal for a low frequency signal encoded in a time domain or a frequency domain or using an excitation spectrum for the low frequency signal. Accordingly, although an audio signal is encoded or decoded using a small number of bits, the quality of sound corresponding to a signal in a high frequency band does not degrade. Therefore, a coding efficiency of the audio signal can be maximized.

41 Claims, 5 Drawing Sheets

METHOD AND APPARATUS TO ENCODE AND/OR DECODE SIGNAL USING BANDWIDTH EXTENSION TECHNOLOGY

CROSS-REFERENCE TO RELATED APPLICATIONS

This application claims the benefit of Korean Patent Application No. 10-2006-0050124, filed on Jun. 3, 2006, and No. 10-2007-0049947, filed on May 22, 2007, in the Korean Intellectual Property Office, the disclosures of which are incorporated herein in their entirety by reference.

BACKGROUND OF THE INVENTION

1. Field of the Invention

The present general inventive concept relates to a method and apparatus to encode and/or decode an audio signal such as a voice signal or a music signal, and more particularly, to a method and apparatus to encode and/or decode a signal corresponding to a high frequency band among an audio signal.

2. Description of the Related Art

In general, it is less important for a human to recognize a signal corresponding to a high frequency band as sound rather than to recognize a signal corresponding to a low frequency band as sound. Accordingly, in order to increase the efficiency of audio signal coding, a large number of bits are allocated to a signal corresponding to the low frequency band, whereas only a few bits are allocated to a signal corresponding to the high frequency band.

Therefore, a conventional method and apparatus has been used for maximally improving the quality of sound perceived by a human even by encoding a signal corresponding to a high frequency band using a small number of bits.

SUMMARY OF THE INVENTION

The present general inventive concept provides a method and to encode and/or decode a high frequency signal by using an excitation signal for a low frequency signal encoded in a time domain or a frequency domain or by using an excitation spectrum for the low frequency signal.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a bandwidth extension encoding method including extracting an excitation signal from a low frequency signal corresponding to a frequency band lower than a predetermined frequency and transforming the excitation signal from a time domain into a frequency domain if the low frequency signal is to be encoded in the time domain, extracting an excitation spectrum from the low frequency signal if the low frequency signal is to be encoded in the frequency domain, generating a spectrum in a frequency band higher than a predetermined frequency by using a spectrum of the transformed excitation signal or the extracted excitation spectrum, and calculating a gain by using the generated spectrum and a spectrum of a high frequency signal corresponding to a frequency band greater than a predetermined frequency.

A bandwidth extension encoding method including extracting an excitation spectrum for a low frequency signal corresponding to a frequency band lower than a predetermined frequency, generating a spectrum in a frequency band higher than a predetermined frequency by using the extracted excitation spectrum, and calculating a gain by using the generated spectrum and a spectrum of a high frequency signal corresponding to a frequency band higher than a predetermined frequency.

A bandwidth extension decoding method including decoding an excitation signal for a low frequency signal corresponding to a frequency band lower than a predetermined frequency and transforming the excitation signal from a time domain into a frequency domain if the low frequency signal has been encoded in the time domain, decoding an excitation spectrum for the low frequency signal if the low frequency signal has been encoded in the frequency domain, generating a spectrum in a frequency band higher than a predetermined frequency by using a spectrum of the transformed excitation signal or the decoded excitation spectrum, and decoding a gain and applying the decoded gain to the generated spectrum.

A bandwidth extension encoding apparatus including a time domain encoding unit to extract an excitation signal from a low frequency signal corresponding to a frequency band lower than a predetermined frequency and to transform the excitation signal from a time domain into a frequency domain if the low frequency signal is to be encoded in the time domain, a frequency domain encoding unit to extract an excitation spectrum from the low frequency signal if the low frequency signal is to be encoded in the frequency domain, a spectrum generation unit to generate a spectrum in a frequency band higher than a predetermined frequency by using a spectrum of the transformed excitation signal or the extracted excitation spectrum, and a gain calculation unit to calculate a gain by using the generated spectrum and a spectrum of a high frequency signal corresponding to a frequency band higher than a predetermined frequency.

A bandwidth extension encoding apparatus including a spectrum extraction unit to extract an excitation spectrum for a low frequency signal corresponding to a frequency band lower than a predetermined frequency, a spectrum generation unit to generate a spectrum in a frequency band greater than a predetermined frequency by using the extracted excitation spectrum, and a gain calculation unit to calculate a gain by using the generated spectrum and a spectrum of a high frequency signal corresponding to a frequency band higher than a predetermined frequency.

A bandwidth extension decoding apparatus including a time domain decoding unit to decode an excitation signal for a low frequency signal corresponding to a frequency band lower than a predetermined frequency and transforming the excitation signal from a time domain into a frequency domain if the low frequency signal has been encoded in the time domain, a frequency domain decoding unit to decode an excitation spectrum for the low frequency signal if the low frequency signal has been encoded in the frequency domain, a spectrum generation unit to generate a spectrum in a frequency band higher than a predetermined frequency by using a spectrum of the transformed excitation signal or the decoded excitation spectrum, and a gain applying unit to decode a gain and applying the decoded gain to the generated spectrum.

A computer readable recording medium having recorded thereon a computer program to execute a bandwidth extension encoding method including extracting an excitation signal from a low frequency signal corresponding to a frequency band lower than a predetermined frequency and transforming the excitation signal from a time domain into a frequency domain if the low frequency signal is to be encoded in the time domain, extracting an excitation spectrum from the low frequency signal if the low frequency signal is to be encoded in the frequency domain, generating a spectrum in a frequency band higher than a predetermined frequency by using a spectrum of the transformed excitation signal or the extracted excitation spectrum, and calculating a gain by using the generated spectrum and a spectrum of a high frequency signal corresponding to a frequency band greater than a predetermined frequency.

A computer readable recording medium having recorded thereon a computer program to execute a bandwidth extension encoding method including extracting an excitation spectrum for a low frequency signal corresponding to a frequency band lower than a predetermined frequency, generating a spectrum in a frequency band greater than a predetermined frequency by using the extracted excitation spectrum, and calculating a gain by using the generated spectrum and a spectrum of a high frequency signal corresponding to a frequency band higher than a predetermined frequency.

A computer readable recording medium having recorded thereon a computer program to execute a bandwidth extension decoding method including decoding an excitation signal for a low frequency signal corresponding to a frequency band lower than a predetermined frequency and transforming the excitation signal from a time domain into a frequency domain if the low frequency signal has been encoded in the time domain, decoding an excitation spectrum for the low frequency signal if the low frequency signal has been encoded in the frequency domain, generating a spectrum in a frequency band higher than a predetermined frequency by using a spectrum of the transformed excitation signal or the decoded excitation spectrum, and decoding a gain and applying the decoded gain to the generated spectrum.

BRIEF DESCRIPTION OF THE DRAWINGS

The above and other aspects and utilities of the present general inventive concept will become more apparent by describing in detail exemplary embodiments thereof with reference to the attached drawings in which.

DETAILED DESCRIPTION OF THE PREFERRED EMBODIMENTS

Figure 1:
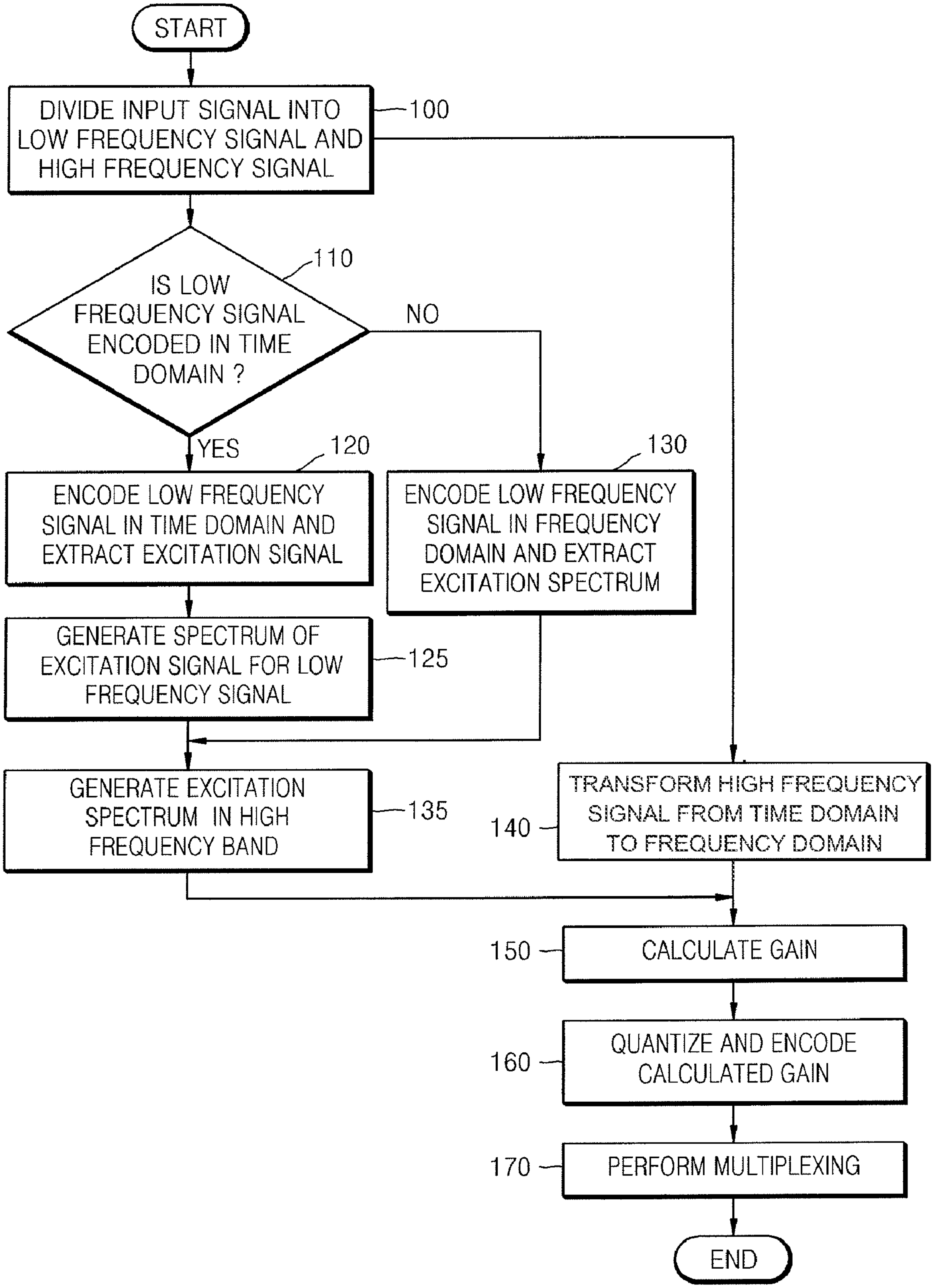
FIG. 1 is a flowchart illustrating a bandwidth extension encoding method according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a flowchart illustrating a bandwidth extension encoding method of an audio system according to an embodiment of the present general inventive concept.

Referring to FIG. 1, in operation 100, an input signal is divided into a low frequency signal and a high frequency signal according to a predetermined frequency. The predetermined frequency may be variable or may include one or more predetermined frequencies. For example, the predetermined frequency may include first and second frequencies. The low frequency signal denotes a signal corresponding to a band that is lower than the first frequency, and the high frequency signal denotes a signal corresponding to a band that is higher than the second frequency. The first and second frequencies maybe set to be a same frequency. It is also possible that the first and second frequencies may be set to be different.

In operation 110, a determination as to whether the low frequency signal obtained in operation 100 is to be encoded either in a time domain or in a frequency domain is made according to one or more predetermined criteria. An audio compression efficiency or a sound quality of an audio signal can be used as an example of the criteria.

When it is determined in operation 110 that the low frequency signal obtained in operation 100 is to be encoded in the time domain, the low frequency signal is encoded in the time domain, in operation 120. Examples of a mode in which the low frequency signal is encoded in the time domain in operation 120 include a code excited linear prediction (CELP) mode and an algebraic code excited linear prediction (ACELP) mode.

In operation 120, when the low frequency signal is being encoded in the time domain, an excitation signal is extracted from the low frequency signal by removing an envelop therefrom. In the present embodiment, the excitation signal may be extracted by removing the envelope from the low frequency signal according to a linear predictive coding (LPC) analysis.

In operation 125, the excitation signal is transformed from the time domain into a frequency domain so as to generate a spectrum of the excitation signal for the low frequency signal. Examples of a mode in which the excitation signal is transformed from the time domain into the frequency domain in operation 125 include fast Fourier transform (FFT), modified discrete cosine transform (MDCT), etc.

On the other hand, when it is determined in operation 110 that the low frequency signal obtained in operation 100 is encoded in the frequency domain, the low frequency signal is encoded in the frequency domain, in operation 130. Examples of a mode in which the low frequency signal is encoded in the frequency domain in operation 130 include a transform coded excitation (TCX) mode.

In operation 130, when the low frequency signal obtained in operation 100 is being encoded in the frequency domain, an excitation spectrum is extracted from the low frequency signal by removing an envelop therefrom.

The extraction of the excitation spectrum in operation 130 while performing encoding according to the TCX mode may be performed according to two embodiments. In one embodiment, the excitation spectrum may be extracted using the spectrum of a weighted speech domain during the TCX mode. In the other embodiment, the excitation spectrum may be generated by removing a perceptual weighting from the low frequency signal by not performing some components during the TCX mode.

Operation 130 may also be achieved using FFT or MDCT. In this case, a high frequency spectrum is restored using an excitation signal spectrum that is the same as an excitation signal spectrum in an ACELP encoding mode.

In operation 135, an excitation spectrum is generated in the high frequency band of which frequency is higher than a predetermined frequency, by using the spectrum of the excitation signal generated in operation 125 or the excitation spectrum extracted in operation 130. That is, in operation 135, the excitation spectrum may be generated by patching either the spectrum of the excitation signal generated in operation 125 or the excitation spectrum extracted in operation 130 to the high frequency band or by folding the generated spectrum of the excitation signal or the extracted excitation spectrum over the high frequency band so that the spectrum of the excitation signal generated in operation 125 or the excitation spectrum extracted in operation 130 and the generated spectrum are symmetrical with respect to the predetermined frequency.

In operation 140, the high frequency signal obtained in operation 100 is transformed from the time domain to the frequency domain so as to generate the high frequency spectrum. Examples of a mode in which the high frequency signal is transformed in operation 140 include FFT, MDCT, etc.

In operation 150, a gain is calculated using the excitation spectrum generated in operation 135 and the high frequency spectrum generated in operation 140. The gain calculated in operation 150 is used when a decoder restores a high frequency spectrum by using the spectrum of a decoded excitation signal for a low frequency signal. In other words, when the decoder generates the high frequency spectrum by using the spectrum of the excitation signal for the low frequency signal, the gain is used to control the envelope of the high frequency spectrum.

In operation 150, the gain may be obtained by calculating a ratio of an energy value of each band for the excitation spectrum generated in operation 135 to an energy value of each band for the high frequency spectrum generated in operation 140, according to Equation 1:

$$g(n) = \sqrt{\frac{\sum_{i}^{N} |Spec_H(i)|^2}{\sum_{i}^{N} |Spec_L(i)|^2}} \tag{1}$$

where g(n) denotes the gain calculated in operation 150, n denotes a band index, i denotes a spectral line index, $Spec_L(i)$ denotes the excitation spectrum generated in operation 135, and $Spec_H(i)$ denotes the high frequency spectrum generated in operation 140, and N denotes a preset constant.

In operation 160, the gain calculated in operation 150 is quantized and encoded. In operation 160, four-dimensional vector quantization may be performed with respect to ACELP, TCX 256, and TCX 512, and two-dimensional vector quantization may be performed with respect to TCX 1024. In operation 160, the gain calculated in operation 150 may also be quantized by Scalar quantization.

In operation 170, a result of the encoding of the low frequency signal in operation 120 or 130 and the gain quantized in operation 150 are multiplexed to thereby generate a bitstream.

However, the bandwidth extension encoding method according to an embodiment of the present general inventive concept may be performed not only using an open-loop mode illustrated in FIG. 1 but also using a close-loop mode in which after operations 120 and 130 are performed, the encoding results are compared to determine whether the low frequency signal is encoded in the time domain or in the frequency.

Figure 2:
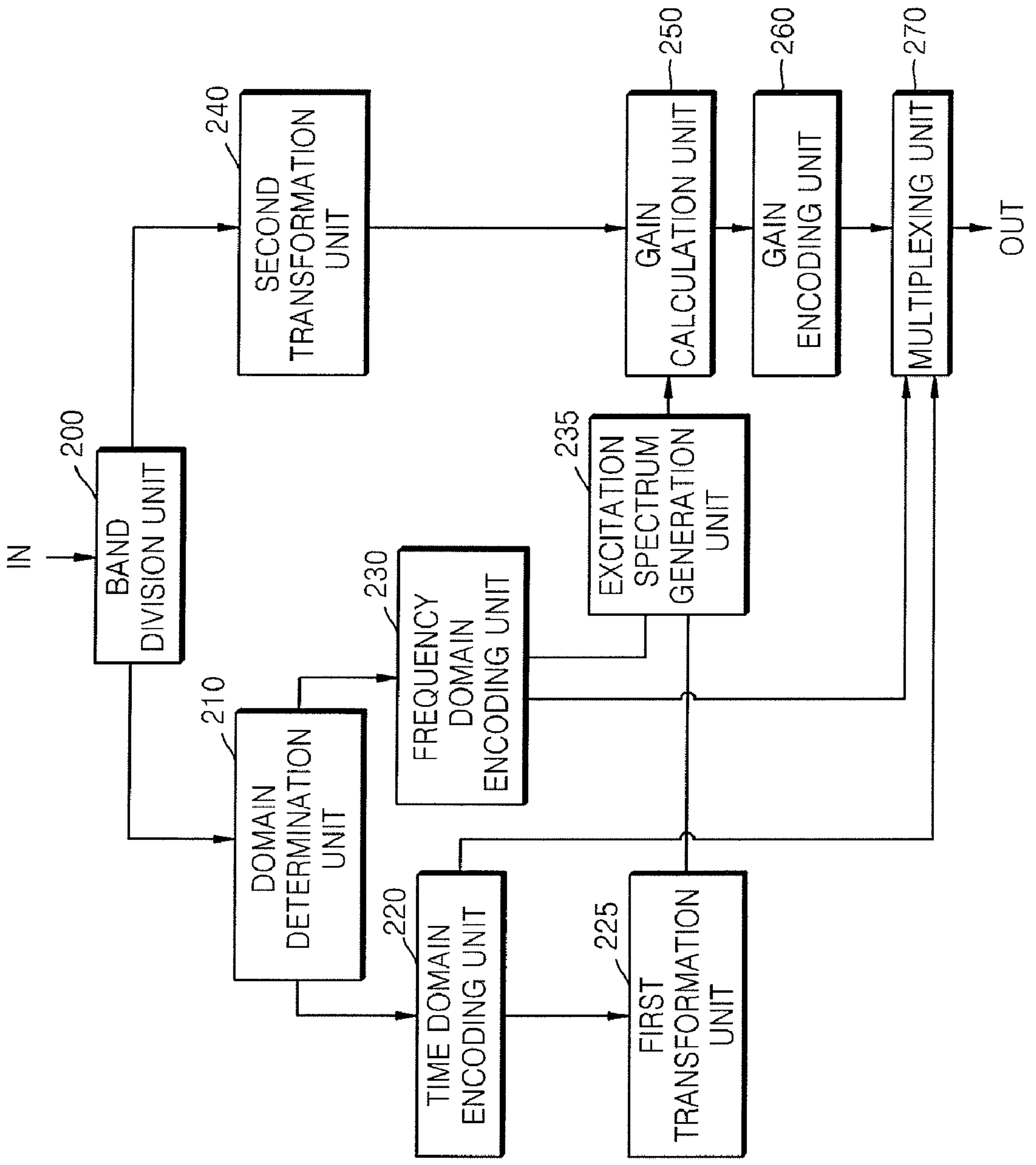
FIG. 2 is a block diagram illustrating a bandwidth extension encoding apparatus according to an embodiment of the present general inventive concept.

FIG. 2 is a block diagram illustrating a bandwidth extension encoding apparatus usable with an audio system according to an embodiment of the present general inventive concept. Referring to FIG. 2, the bandwidth extension encoding apparatus includes a band division unit 200, a domain determination unit 210, a time domain encoding unit 220, a first transformation unit 225, a frequency domain encoding unit 230, an excitation spectrum generation unit 235, a second transformation unit 240, a gain calculation unit 250, a gain encoding unit 260, and a multiplexing unit 270.

The band division unit 200 receives an input signal via an input terminal IN and divides the input signal into a low frequency signal and a high frequency signal a according to one or more predetermined frequencies. The low frequency signal denotes a signal corresponding to a band that is lower than a predetermined first frequency, and the high frequency signal denotes a signal corresponding to a band that is higher than a predetermined second frequency. The first and second frequencies may be set to be the same frequency. It is possible that the first and second frequencies may be set to be different.

The domain determination unit 210 determines whether the low frequency signal divided by the band division unit 200 is to be encoded either in a time domain or in a frequency domain, according to one or more predetermined criteria. A signal compression or encoding efficiency can be used as the criteria to improve a sound quality and a data compression ratio in an audio encoding and decoding system, for example.

When the domain determination unit 210 determines that the low frequency signal is to be encoded in a time domain, the time domain encoding unit 220 encodes the low frequency signal in the time domain. Examples of a mode in which the low frequency signal is encoded in the time domain by the time domain encoding unit 220 include a code excited linear Prediction (CELP) mode and an algebraic code excited linear prediction (ACELP) mode.

While encoding the low frequency signal in the time domain, the time domain encoding unit 220 extracts an excitation signal by removing an envelope therefrom. In an embodiment, the excited signal may be extracted by removing the envelope from the low frequency signal according to an LPC analysis.

The first transformation unit 225 transforms the excitation signal extracted by the time domain encoding unit 220 from the time domain into a frequency domain so as to generate an excitation signal spectrum for the low frequency signal. Examples of a mode in which the excitation signal is transformed by the first transformation unit 225 include FFT, MDCT, etc.

On the other hand, when the domain determination unit 210 determines that the low frequency signal divided by the band division unit 200 is encoded in a frequency domain, the frequency domain encoding unit 230 encodes the low frequency signal in the frequency domain. Examples of a mode in which the low frequency signal is encoded in the frequency domain by the frequency domain encoding unit 230 include a TCX mode.

While encoding the low frequency signal in the frequency domain, the frequency domain encoding unit 230 extracts an excitation spectrum by removing an envelope from the low frequency signal.

The extraction of the excitation spectrum by the frequency domain encoding unit 230 while performing encoding according to the TCX mode may be performed according to two embodiments. In one embodiment, the excitation spectrum may be extracted using the spectrum of a weighted speech domain during the TCX mode. In the other embodiment, the excitation spectrum may be generated by removing a perceptual weighting from the low frequency signal by not performing some components during execution of the TCX mode.

Transform executed in the TCX mode performed by the frequency domain encoding unit 230 may also be achieved using FFT or MDCT. In this case, a high frequency spectrum is restored using an excitation signal spectrum that is the same as an excitation signal spectrum in an ACELP encoding mode.

The excitation spectrum generation unit 235 generates an excitation spectrum in a high frequency band of which frequency is higher than a predetermined frequency, by using the spectrum of the excitation signal generated by the first transformation unit 225 or the excitation spectrum extracted by the frequency domain encoding unit 230. the excitation spectrum generation unit 235 may generate the excitation spectrum by patching either the spectrum of the excitation signal generated by the first transformation unit 225 or the excitation spectrum extracted by the excitation spectrum generation unit 235 to the high frequency band or by folding the generated spectrum of the excitation signal or the extracted excitation spectrum over the high frequency band so that the spectrum of the excitation signal generated by the first transformation unit 225 or the excitation spectrum extracted by the excitation spectrum generation unit 235 and the generated spectrum are symmetrical with respect to the predetermined frequency.

The second transformation unit 240 transforms the high frequency signal divided by the domain division unit 200 from the time domain to the frequency domain so as to generate a high frequency spectrum. Examples of a mode in which the high frequency signal is transformed from the time main to the frequency domain by the second transformation unit 240 include FFT, MDCT, etc.

The gain calculation unit 250 calculates a gain by using the excitation spectrum generated by the excitation spectrum generation unit 235 and the high frequency spectrum generated by the second transformation unit 240. The gain calculated by the gain calculation unit 250 is used when a decoder restores a high frequency spectrum by using the spectrum of a decoded excitation signal for a low frequency signal. In other words, when the decoder generates the high frequency spectrum by using the spectrum of the excitation signal for the low frequency signal, the gain is used to control the envelope of the high frequency spectrum.

The gain calculation unit 250 may obtain the gain by calculating a ratio of an energy value of each band for the excitation spectrum generated by the excitation spectrum generation unit 235 to an energy value of each band for the high frequency spectrum generated by the second transformation unit 240, according to Equation 2:

$$g(n)=\sqrt{\frac{\sum_{i}^{N}|Spec_H(i)|^2}{\sum_{i}^{N}|Spec_L(i)|^2}} \tag{2}$$

where g(n) denotes the gain calculated in the gain calculation unit 250, n denotes a band index, i denotes a spectral line index, $Spec_L(i)$ denotes the excitation spectrum generated by the excitation spectrum generation unit 235, and $Spec_H(i)$ denotes the high frequency spectrum generated by the second transformation unit 240, and N denotes a preset constant.

The gain encoding unit 260 quantizes and encodes the gain calculated by the gain calculation unit 250. the gain encoding unit 260 may perform four-dimensional vector quantization with respect to ACELP, TCX 256, and TCX 512, and perform two-dimensional vector quantization with respect to TCX 1024. The gain encoding unit 260 may quantize the gain calculated by the gain calculation unit 250, according to Scalar quantization.

The multiplexing unit 270 multiplexes a result of the encoding of the low frequency signal by the time domain encoding unit 220 or the frequency domain encoding unit 230 and the gain quantized by the gain encoding unit 260 so as to generate a bitstream and output the bitstream via an output terminal OUT.

However, the bandwidth extension encoding apparatus according to an embodiment of the present general inventive concept may perform bandwidth extension encoding not only using the open-loop mode illustrated in FIG. 2 but also using a close-loop mode in which the time domain encoding unit 220 and the frequency domain encoding unit 230 perform encoding operations, the encoding results are compared with each other, and then the domain determination unit 210 determines whether the low frequency signal is to be encoded in the time domain or in the frequency.

Figure 3:
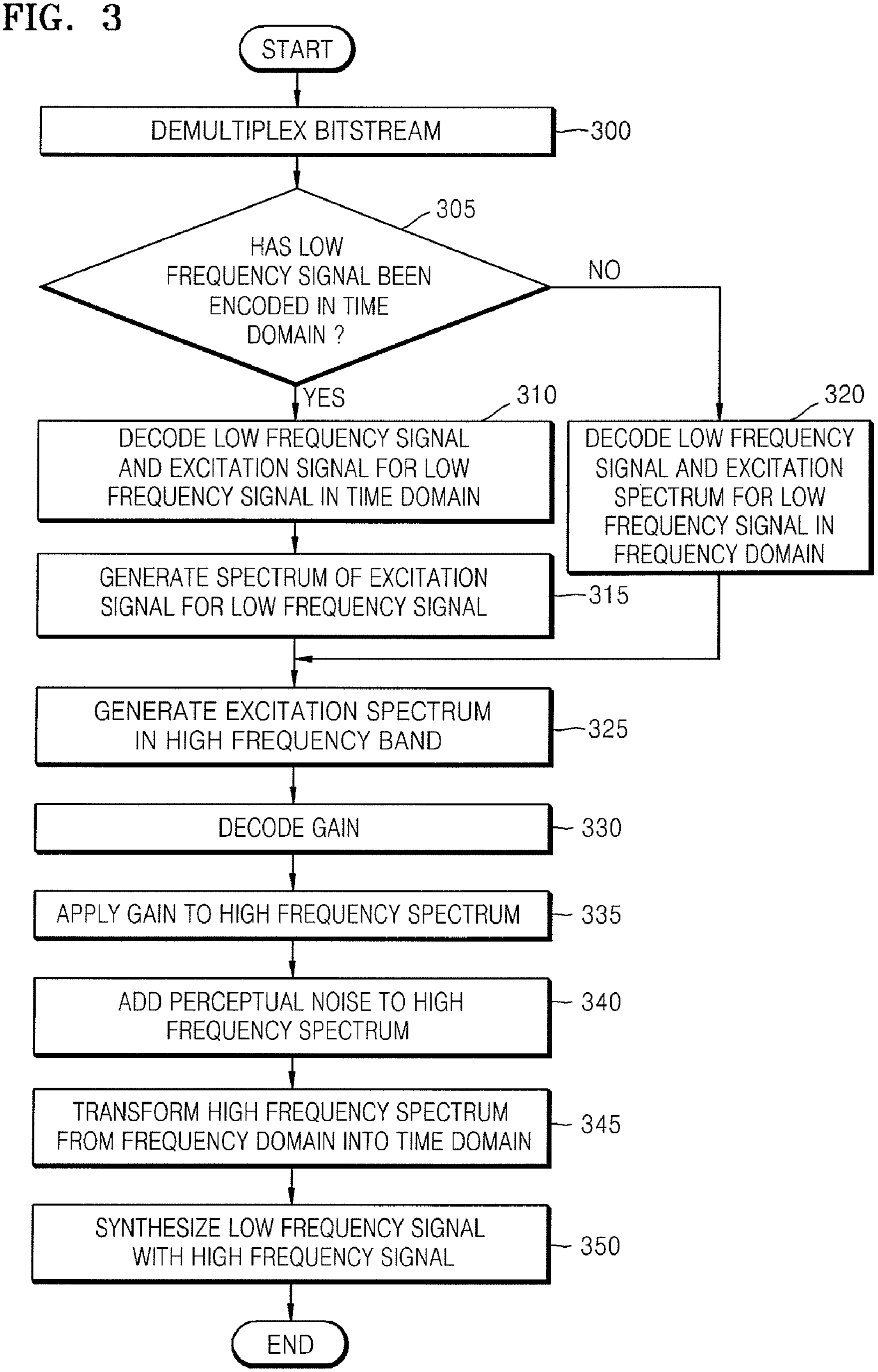
FIG. 3 is a flowchart illustrating a bandwidth extension decoding method according to an embodiment of the present general inventive concept.

FIG. 3 is a flowchart illustrating a bandwidth extension decoding method according to an embodiment of the present general inventive concept.

Referring to FIG. 3, in operation 300, a decoder receives a bitstream from an encoder and the received bitstream is demultiplexed. The bitstream includes a result of encoding of a low frequency signal in a time domain or a frequency domain and a gain encoded by the encoder. The low frequency signal denotes a signal corresponding to a frequency band that is lower than a first frequency.

In operation 305, it is determined whether the low frequency signal demultiplexed in operation 300 has been encoded either in the time domain or in the frequency domain by the encoder. Here, a determination of whether the low frequency signal has been encoded in the time domain or the frequency domain can be made according to information included in the bitstream. It is possible that the decoder stores the information on a determination of whether the low frequency signal has been encoded in the time domain or the frequency domain.

When it is determined in operation 305 that the low frequency signal has been encoded in the time domain, the low frequency signal obtained in operation 300 and an excitation signal for the low frequency signal are decoded in the time domain, in operation 310. Examples of a mode in which the low frequency signal is decoded in the time domain in operation 310 include code excited linear prediction (CELP) and algebraic code excited linear prediction (ACELP).

In operation 315, the excitation signal decoded in operation 310 is transformed from the time domain into the frequency domain so as to generate a spectrum of the excitation signal for the low frequency signal. Examples of a mode in which the excitation signal is transformed from the time domain to the frequency domain in operation 315 include FFT, MDCT, etc.

On the other hand, when it is determined in operation 305 that the low frequency signal has been encoded in the frequency domain, the low frequency signal obtained in operation 300 is decoded in the frequency domain and an excitation spectrum for the low frequency signal are generated in the frequency domain, in operation 320. Examples of a mode in which the low frequency signal is decoded in the frequency domain in operation 320 include a TCX mode.

In operation 325, a high frequency spectrum is generated in a high frequency band of which frequency is higher than a predetermined frequency by using the spectrum of the excitation signal generated in operation 315 or the excitation spectrum generated in operation 320. The high frequency spectrum denotes a spectrum corresponding to a frequency band of which frequency is higher than a second frequency. The first and second frequencies may be set to be identical. It is also possible that the first and second frequencies may be set to be different.

In operation 325, the high frequency spectrum may be generated by patching either the spectrum of the excitation signal generated in operation 315 or the excitation spectrum generated in operation 320 to the high frequency band or by folding the generated spectrum of the excitation signal generated in operation 315 or the generated excitation spectrum generated in operation 320 over the high frequency band so that spectrum of the excitation signal generated in operation 315 or the excitation spectrum generated in operation 320 and the generated higher frequency spectrum generated in operation 325 are symmetrical with respect to the predetermined frequency.

The patching method denotes a method of copying a spectrum, and the folding method denotes a method of forming a mirror image of a spectrum symmetrically with respect to a reference frequency.

Figure 5:
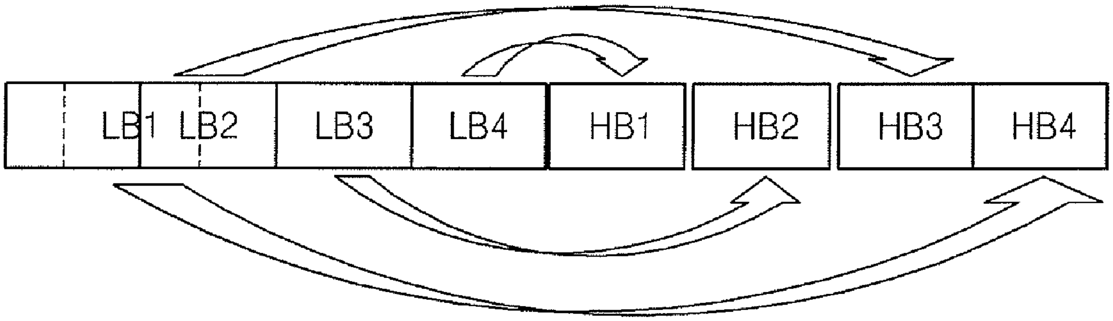
FIG. 5 is a graph illustrating a folding mode performed in the bandwidth extension encoding and decoding apparatuses illustrated in FIGS. 2 and 4, according to an embodiment of the present general inventive concept.
Figure 6:
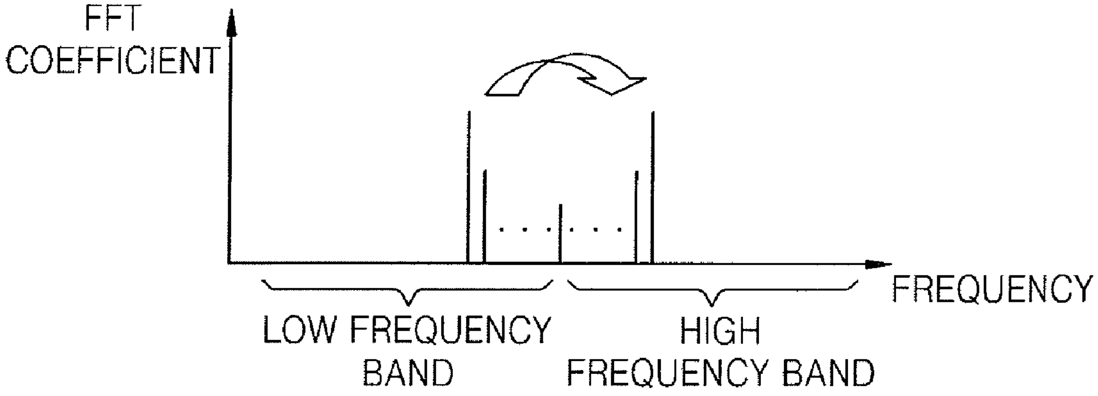
FIG. 6 is a graph illustrating a folding mode performed in the bandwidth extension encoding and decoding apparatuses illustrated in FIGS. 2 and 4, according to another embodiment of the present general inventive concept.

A folding method is illustrated in FIGS. 5 and 6. HB1 (High Band 1) is generated to be symmetrical with LB4 (Low Band 4) about the frequency that is used to divide an input signal into a low frequency signal and a high frequency signal, HB2 (High Band 2) is generated to be symmetrical with LB3 about the frequency, HB3 (High Band 3) is generated to be symmetrical with LB2 about the frequency, and HB4 is generated to be symmetrical with LB1 about the basis frequency. In operation 325, the high frequency spectrum is generated by folding the spectrum of the excitation signal generated in operation 315 or the excitation spectrum generated in operation 320, according to the two following embodiments.

In one embodiment, all of the frequency bands of the spectrum of the excitation signal generated in operation 315 or the excitation spectrum generated in operation 320 are folded over the frequency band higher than the second frequency. Each of the frequency bands to be folded includes a real part and an imaginary part. Depending on an encoding mode, the number of frequency bands varies as shown in Table 1.

TABLE 1

| Encoding mode | Number of bands |
|---|---|
| ACELP | 4 |
| TCX 256 | 4 |
| TCX 512 | 8 |
| TCX 1024 | 8 |

In the other embodiment, the high frequency spectrum is generated by removing a part corresponding to a specific frequency band such as 0~1 KHz from the spectrum of the excitation signal generated in operation 315 or the excitation spectrum generated in operation 320 and folding the result of the removal. When folding the spectrum, the removed part is folded using a part of the LB2 as illustrated in FIG. 5. The high frequency spectrum may be generated by folding a result obtained by removing a part corresponding to a specific frequency band from the spectrum of the excitation signal generated in operation 315 or the excitation spectrum generated in operation 320 according to Equation 3:

$$StartFreq=\max(m*N_{FFT}/N_{Band}, N_{FFT}/6.4) \quad (3)$$

where StantFreq denotes a frequency from which folding starts, and $N_{FFT}/N_{Band}$ is 72.

In operation 330, a gain for each of the bands obtained by the demultiplexing performed in operation 300 is decoded.

In operation 335, the gain for each of the bands decoded in operation 330 is applied to the high frequency spectrum for each band generated in operation 325. The envelope of the high frequency spectrum is controlled by applying the gain to the high frequency spectrum in operation 335.

In operation 340, perceptual noise is added to the high frequency spectrum to which the gain has been applied in operation 335. The perceptual noise may be obtained from information included in the bitstream. It is possible that the perceptual noise can be determined by a characteristic of the bitstream.

In operation 340, the noise may be added using a parameter received from an encoder, or may be adaptively added according to a mode in which a decoder decodes the low frequency signal.

The noise to be added is generated according to a pre-set method stored in the decoder as shown in Equation 4:

$$HBCoef=HBcoef*scale+HBCoef*RandCoef*(1-scale) \quad (4)$$

where Randcoef denotes a random number having an average value of 0 and a standard deviation of 1, HBCoef denotes a high frequency spectrum, and scale is calculated using the following Equations that depend on modes in which the decoder decodes the low frequency signal.

If the mode in which the low frequency signal is decoded in operation 310 or 320 is ACELP or TCX 256, the scale is calculated using Equation 5:

$$scale=(bandIdx+1)/N_{band} \quad (5)$$

where bandIdx denotes a value obtained by subtracting 1 from a value in between 0 and $N_{band}$.

If the mode in which the low frequency signal is decoded in operation 310 or 320 is TCX 512 or TCX 1024, the scale is calculated using Equation 6:

$$scale=(bandIdx*72+n+1)/N_{FFT} \quad (6)$$

wherein bandIdx denotes a value obtained by subtracting 1 from a value in between 0 and $N_{band}$, and n denotes 0 to 71.

In operation 345, the high frequency spectrum to which the noise has been added in operation 340 is transformed from the frequency domain into the time domain so as to generate a high frequency signal.

In operation 350, the low frequency signal decoded in operation 310 or 320 and the high frequency signal generated in operation 345 are synthesized.

Figure 4:
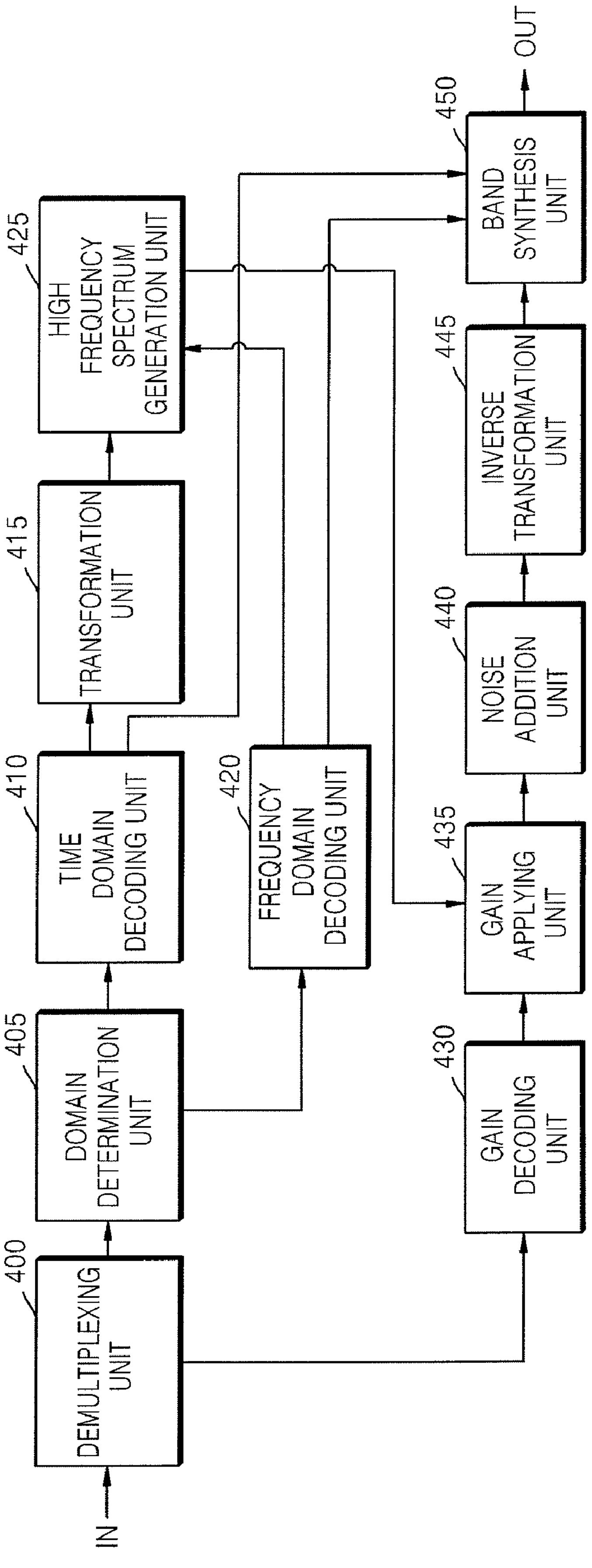
FIG. 4 is a block diagram illustrating a bandwidth extension decoding apparatus according to an embodiment of the present general inventive concept.

FIG. 4 is a block diagram illustrating a bandwidth extension decoding apparatus according to an embodiment of the present general inventive concept. Referring to FIG. 4, the bandwidth extension decoding apparatus includes a demultiplexing unit 400, a domain determination unit 405, a time domain decoding unit 410, a transformation unit 415, a frequency domain decoding unit 420, a high frequency spectrum generation unit 425, a gain decoding unit 430, a gain applying unit 435, a noise addition unit 440, an inverse transformation unit 445, and a band synthesis unit 450.

The demultiplexing unit 400 receives a bitstream from an encoder and demultiplexes the bitstream. The bitstream includes a result of encoding of a low frequency signal in a time domain or a frequency domain and a gain encoded by the encoder. The low frequency signal denotes a signal corresponding to a frequency band that is lower than a first frequency.

The domain determination unit 405 determines whether the low frequency signal demultiplexed by the demultiplexing unit 400 has been encoded either in the time domain or in the frequency domain by the encoder. Whether the low frequency signal has been encoded in the time domain or the frequency domain can be determined according to information included in the bitstream. It is possible that the decoder stores the information on a determination of whether the low frequency signal has been encoded in the time domain or the frequency domain.

When the domain determination unit 405 determines that the low frequency signal has been encoded in the time domain, the time domain decoding unit 410 decodes the low frequency signal obtained by the demultiplexing unit 400 and an excitation signal for the low frequency signal in the time domain. Examples of a mode in which the low frequency signal is decoded in the time domain by the time domain decoding unit 410 include code excited linear prediction (CELP) and algebraic code excited linear prediction (ACELP).

The transformation unit 415 transforms the excitation signal decoded by the time domain decoding unit 410 from the time domain into the frequency domain so as to generate a spectrum of the excitation signal for the low frequency signal. An example of a mode in which the excitation signal is transformed from the time domain to the frequency domain by the transformation unit 415 may include FFT, MDCT, etc.

On the other hand, when the domain determination unit 405 determines that the low frequency signal has been encoded in the frequency domain, the frequency domain decoding unit 420 decodes the low frequency signal obtained by the demultiplexing unit 400 and generates an excitation spectrum for the low frequency signal in the frequency domain. An example of a mode in which the low frequency signal is decoded in the frequency domain by the frequency domain decoding unit 420 may include a TCX mode.

The high frequency spectrum generation unit 425 generates a high frequency spectrum of a high frequency band higher than a predetermined frequency by using the spectrum of the excitation signal generated by the transformation unit 415 or the excitation spectrum generated by the frequency domain decoding unit 420. The high frequency spectrum denotes a spectrum corresponding to a frequency band higher than a second frequency. The first and second frequencies may be set to be a same frequency. It is also possible that the first and second frequencies may be set to be different.

The high frequency spectrum generation unit 425 may generate the high frequency spectrum by patching either the spectrum of the excitation signal generated by the transformation unit 415 or the excitation spectrum generated by the frequency domain decoding unit 420 to the high frequency band or by folding the generated spectrum of the excitation signal or the generated excitation spectrum over the high frequency band so that the spectrum of the excitation signal generated by the transformation unit 415 or the excitation spectrum generated by the frequency domain decoding unit 420 and the generated high frequency spectrum are symmetrical with respect to the predetermined frequency.

The patching method denotes a method of copying a spectrum, and the folding method denotes a method of forming a mirror image of a spectrum symmetrically with respect to a reference frequency.

A folding method is illustrated in FIGS. 5 and 6. HB1 (High Band 1) is generated to be symmetrical with LB4 (Low Band 4) about the frequency that is used to divide an input signal into a low frequency signal and a high frequency signal, HB2 (High Band 2) is generated to be symmetrical with LB3 about the frequency, HB3 (High Band 3) is generated to be symmetrical with LB2 about the frequency, and HB4 is generated to be symmetrical with LB1 about the basis frequency. The high frequency spectrum generation unit 425 generates the high frequency spectrum by folding the spectrum of the excitation signal generated by the transformation unit 415 or the excitation spectrum generated by the frequency domain decoding unit 420, according to the two following embodiments.

In one embodiment, all of the frequency bands of the spectrum of the excitation signal generated by the transformation unit 415 or the excitation spectrum generated by the frequency domain decoding unit 420 are folded over the frequency band higher than the second frequency. Each of the frequency bands to be folded includes a real part and an imaginary part. Depending on an encoding mode, the number of frequency bands varies as shown in Table 2.

TABLE 2

| Encoding mode | Number of bands |
|---|---|
| ACELP | 4 |
| TCX 256 | 4 |
| TCX 512 | 8 |
| TCX 1024 | 8 |

In the other embodiment, the high frequency spectrum is generated by removing a part corresponding to a specific frequency band such as 0~1 KHz from the spectrum of the excitation signal generated by the transformation unit 415 or the excitation spectrum generated by the frequency domain decoding unit 420 and folding the result of the removal. When folding the spectrum, the removed part is folded using a part of the LB2 as illustrated in FIG. 5. The high frequency spectrum may be generated by folding a result obtained by removing a part corresponding to a specific frequency band from the spectrum of the excitation signal generated by the transformation unit 415 or the excitation spectrum generated by the frequency domain decoding unit 420 according to Equation 7:

$$\text{StartFreq}=\max(m*N_{FFT}/N_{Band},N_{FFT}/6.4) \quad (7)$$

where StantFreq denotes a frequency from which folding starts, and $N_{FFT}/N_{Band}$ is 72.

The gain decoding unit 430 decodes a gain for each of the bands obtained by the demultiplexing unit 400.

The gain applying unit 435 applies the gain for each of the bands decoded by the gain decoding unit 430 to the high frequency spectrum for each band generated by the high frequency spectrum generation unit 425. The envelope of the high frequency spectrum is controlled by applying the gain to the high frequency spectrum by the gain applying unit 435.

The noise addition unit 440 adds perceptual noise to the high frequency spectrum to which the gain has been applied by the gain applying unit 435. The perceptual noise may be obtained from information in the bitstream. It is possible that the perceptual noise can be determined by a characteristic of the bitstream.

The noise addition unit 440 may add the noise by using a parameter received from an encoder, or may adaptively add the noise according to a mode in which a decoder decodes the low frequency signal.

The noise to be added is generated according to a pre-set method stored in the decoder as shown in Equation 8:

$$HBCoef=HBcoef*scale+HBCoef*RandCoef*(1-scale) \quad (8)$$

where Randcoef denotes a random number having an average value of 0 and a standard deviation of 1, HBCoef denotes a high frequency spectrum, and scale is calculated using the following Equations that depend on modes in which the decoder decodes the low frequency signal.

If the mode in which the low frequency signal is decoded by the time domain decoding unit 410 or the frequency domain decoding unit 420 is ACELP or TCX 256, the scale is calculated using Equation 9:

$$scale=(bandIdx+1)/N_{band} \quad (9)$$

where bandIdx denotes a value obtained by subtracting 1 from a value in between 0 and $N_{band}$.

If the mode in which the low frequency signal is decoded by the time domain decoding unit 410 or the frequency domain decoding unit 420 is TCX 512 or TCX 1024, the scale is calculated using Equation 10:

$$scale=(bandIdx*72+n+1)/N_{FFT} \quad (10)$$

where bandIdx denotes a value obtained by subtracting 1 from a value in between 0 and $N_{band}$, and n denotes 0 to 71.

The inverse transformation unit 445 transforms the high frequency spectrum to which the noise has been added by the noise addition unit 440 from the frequency domain into the time domain so as to generate a high frequency signal.

The band synthesis unit 450 synthesizes the low frequency signal decoded by the time domain decoding unit 410 or the frequency domain decoding unit 420 with the high frequency signal generated by inverse transformation unit 445.

The general inventive concept can also be embodied as computer readable codes on a computer readable medium. A term "computer" involves all devices with data processing capability. The computer readable medium may include a computer readable recording medium and a computer readable transmission medium. The computer readable recording medium is any data storage device that can store programs or data which can be thereafter read by a computer system. Examples of the computer readable recording medium include read-only memory (ROM), random-access memory (RAM), CD-ROMs, magnetic tapes, hard disks, floppy disks, flash memory, optical data storage devices, and so on. The computer readable transmission medium may be distributed as a signal wave between computers through a wired or wireless network or the Internet.

In a method and apparatus to perform bandwidth extension encoding and decoding according to the present general inventive concept, a high frequency signal is encoded or decoded using an excitation signal for a low frequency signal encoded in a time domain or a frequency domain or using an excitation spectrum for the low frequency signal.

Accordingly, although an audio signal is encoded or decoded using a small number of bits, the quality of a sound corresponding to a signal in a high frequency band does not degrade. Therefore, the coding efficiency can be maximized.

According to the present general inventive concept, the above-described apparatus and method can be embodied in an audio processing system, such as an audio encoder to encode an audio signal according to a lossy encoding method, and/or an audio decoder to decode a compressed audio signal encoded by a lossy encoding method. However, the present general inventive concept is not limited thereto. The above-described method and apparatus can be used in an audio and video system to encode and/or decode audio and video signals.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A bandwidth extension encoding method comprising:

extracting an excitation signal from a low frequency signal corresponding to a frequency band lower than a predetermined frequency and transforming the excitation signal from a time domain into a frequency domain, if the low frequency signal is to be encoded in the time domain;

extracting an excitation spectrum from the low frequency signal if the low frequency signal is to be encoded in the frequency domain;

generating a spectrum in a frequency band higher than the predetermined frequency by using a spectrum of the transformed excitation signal or the extracted excitation spectrum; and calculating a gain by using the generated spectrum and a spectrum of a high frequency signal corresponding to the frequency band higher than the predetermined frequency.

2. The bandwidth extension encoding method of claim 1, further comprising:

encoding the low frequency signal in the extracting and transforming of the excitation signal by code excited linear prediction (CELP) or algebraic code excited linear prediction (ACELP).

3. The bandwidth extension encoding method of claim 1, further comprising:

encoding the low frequency signal in the extracting of the excitation spectrum by transform coded excitation (TCX).

4. The bandwidth extension encoding method of claim 1, further comprising:

encoding the calculated gain.

5. The bandwidth extension encoding method of claim 1, wherein the generating of the spectrum comprises generating the spectrum by folding the spectrum of the transformed excited signal or the extracted excitation spectrum over the frequency band higher than the predetermined frequency or by patching the spectrum of the transformed excited signal or the extracted excitation spectrum to the frequency band higher than the predetermined frequency so that the spectrum of the transformed excited signal or the extracted excitation spectrum and the generated spectrum are symmetrical.

6. The bandwidth extension encoding method of claim 1, wherein the calculating of the gain comprises obtaining the gain by calculating a ratio of an energy value for the generated spectrum to an energy value for the spectrum of the high frequency signal.

7. The bandwidth extension encoding method of claim 1, wherein the extracting and transforming of the excitation signal comprises extracting the excitation signal by removing an envelope from the low frequency signal according to an LPC (linear predictive coding) analysis.

8. The bandwidth extension encoding method of claim 1, wherein the extracting of the excitation spectrum comprises extracting the excitation spectrum from the low frequency signal by using a spectrum of a weighted speech domain during transform coded excitation (TCX).

9. The bandwidth extension encoding method of claim 1, wherein the extracting of the excitation spectrum comprises extracting the excitation spectrum from the low frequency signal by removing a perceptual weighting from the low frequency signal during transform coded excitation (TCX).

10. A bandwidth extension encoding method comprising:

extracting an excitation spectrum for a low frequency signal corresponding to a frequency band lower than a predetermined frequency;

generating a spectrum in a frequency band higher than the predetermined frequency by using the extracted excitation spectrum; and calculating a gain by using the generated spectrum and a spectrum of a high frequency signal corresponding to a frequency band higher than the predetermined frequency.

11. The bandwidth extension encoding method of claim 10, wherein the extracting of the excitation spectrum comprises extracting an excitation signal from the low frequency signal and transformed from the time domain into a frequency domain.

12. A bandwidth extension decoding method comprising:

decoding an excitation signal for a low frequency signal corresponding to a frequency band lower than a predetermined frequency and transforming the excitation signal from a time domain into a frequency domain, if the low frequency signal has been encoded in the time domain;

generating an excitation spectrum for the low frequency signal if the low frequency signal has been encoded in the frequency domain;

generating a spectrum in a frequency band higher than a predetermined frequency by using a spectrum of the transformed excitation signal or the generated excitation spectrum; and decoding a gain and applying the decoded gain to the generated spectrum.

13. The bandwidth extension decoding method of claim 12, wherein the decoding and transforming of the excitation signal comprises decoding the low frequency signal by code excited linear prediction (CELP) or algebraic code excited linear prediction (ACELP).

14. The bandwidth extension decoding method of claim 12, wherein the generating of the excitation spectrum comprises decoding the low frequency signal by transform coded excitation (TCX).

15. The bandwidth extension decoding method of claim 12, wherein the generating of the spectrum comprises generating the spectrum by folding the spectrum of the transformed excited signal or the generated excitation spectrum over the frequency band higher than the predetermined frequency or by patching the spectrum of the transformed excited signal or the generated excitation spectrum to the frequency band higher than the predetermined frequency so that the spectrum of the transformed excited signal or the generated excitation spectrum and the generated spectrum are symmetrical.

16. The bandwidth extension decoding method of claim 12, further comprising:

decoding the low frequency signal.

17. The bandwidth extension decoding method of claim 16, further comprising:

transforming the spectrum to which the gain has been applied from the frequency domain into the time domain; and synthesizing the decoded low frequency signal with the transformed spectrum.

18. The bandwidth extension decoding method of claim 12, further comprising:

adding perceptual noise to the generated spectrum or the spectrum to which the gain has been applied.

19. A bandwidth extension encoding apparatus comprising:

a time domain encoding unit to extract an excitation signal from a low frequency signal corresponding to a frequency band lower than a predetermined frequency and to transform the excitation signal from a time domain into a frequency domain, if the low frequency signal is to be encoded in the time domain;

a frequency domain encoding unit to extract an excitation spectrum from the low frequency signal if the low frequency signal is to be encoded in the frequency domain;

a spectrum generation unit generating a spectrum in a frequency band higher than the predetermined frequency by using a spectrum of the transformed excitation signal or the extracted excitation spectrum; and a gain calculation unit to calculate a gain by using the generated spectrum and a spectrum of a high frequency signal corresponding to a frequency band higher than the predetermined frequency.

20. The bandwidth extension encoding apparatus of claim 19, wherein the time domain encoding unit encodes the low frequency signal according to code excited linear prediction (CELP) or algebraic code excited linear prediction (ACELP).

21. The bandwidth extension encoding apparatus of claim 19, wherein the frequency domain encoding unit encodes the low frequency signal according to transform coded excitation (TCX).

22. The bandwidth extension encoding apparatus of claim 19, further comprising:

a gain encoding unit to encode the calculated gain.

23. The bandwidth extension encoding apparatus of claim 19, wherein the spectrum generation unit generates the spectrum by folding the spectrum of the transformed excited signal or the extracted excitation spectrum over the frequency band higher than the predetermined frequency or by patching the spectrum of the transformed excited signal or the extracted excitation spectrum to the frequency band higher than the predetermined frequency so that the spectrum of the transformed excited signal or the extracted excitation spectrum and the generated spectrum are symmetrical.

24. The bandwidth extension encoding apparatus of claim 19, wherein the gain calculation unit obtains the gain by calculating a ratio of an energy value for the generated spectrum to an energy value for the spectrum of the high frequency signal.

25. The bandwidth extension encoding apparatus of claim 19, wherein the time domain encoding unit extracts the excitation signal by removing an envelope from the low frequency signal according to an LPC (linear predictive coding) analysis.

26. The bandwidth extension encoding apparatus of claim 19, wherein the frequency domain encoding unit extracts the excitation spectrum from the low frequency signal by using a spectrum of a weighted speech domain during transform coded excitation (TCX).

27. The bandwidth extension encoding apparatus of claim 19, wherein the frequency domain encoding unit extracts the excitation spectrum from the low frequency signal by removing a perceptual weighting from the low frequency signal during transform coded excitation (TCX).

28. A bandwidth extension encoding apparatus comprising:

a spectrum extraction unit to generate an excitation spectrum for a low frequency signal corresponding to a frequency band lower than a predetermined frequency;

a spectrum generation unit generating a spectrum in a frequency band higher than the predetermined frequency by using the extracted excitation spectrum; and a gain calculation unit calculating a gain by using the generated spectrum and a spectrum of a high frequency signal corresponding to a frequency band higher than the predetermined frequency.

29. The bandwidth extension encoding apparatus of claim 28, wherein the spectrum extraction unit extracts an excitation signal from the low frequency signal and transforms the excitation signal from a time domain into a frequency domain.

30. A bandwidth extension decoding apparatus comprising:

a time domain decoding unit to decode an excitation signal for a low frequency signal corresponding to a frequency band lower than a predetermined frequency and to transform the excitation signal from a time domain into a frequency domain, if the low frequency signal has been encoded in the time domain;

a frequency domain decoding unit to generate an excitation spectrum for the low frequency signal if the low frequency signal has been encoded in the frequency domain;

a spectrum generation unit to generate a spectrum in a frequency band higher than a predetermined frequency by using a spectrum of the transformed excitation signal or the generated excitation spectrum; and a gain applying unit to decode a gain and to apply the decoded gain to the generated spectrum.

31. The bandwidth extension decoding apparatus of claim 30, wherein the time domain decoding unit decodes the low frequency signal according to code excited linear prediction (CELP) or algebraic code excited linear prediction (ACELP).

32. The bandwidth extension decoding apparatus of claim 30, wherein the frequency domain decoding unit decodes the low frequency signal according to transform coded excitation (TCX).

33. The bandwidth extension decoding apparatus of claim 30, wherein the spectrum generation unit generates the spectrum by folding the spectrum of the transformed excited signal or the generated excitation spectrum over the frequency band greater than the predetermined frequency or by patching the spectrum of the transformed excited signal or the generated excitation spectrum to the frequency band greater than the predetermined frequency so that the spectrum of the transformed excited signal or the generated excitation spectrum and the generated spectrum are symmetrical.

34. The bandwidth extension decoding apparatus of claim 30, further comprising:

a low frequency signal decoding unit to decode the low frequency signal.

35. The bandwidth extension decoding apparatus of claim 30, further comprising:

an inverse transformation unit to transform the spectrum to which the gain has been applied from the frequency domain into the time domain; and a band synthesis unit to synthesize the decoded low frequency signal with the transformed spectrum.

36. The bandwidth extension decoding apparatus of claim 30, further comprising:

a noise addition unit to add perceptual noise to the generated spectrum or the spectrum to which the gain has been applied.

37. A non-transitory computer readable medium having computer-readable codes recorded thereon as a computer program to execute a bandwidth extension encoding method comprising:

extracting an excitation signal from a low frequency signal corresponding to a frequency band smaller than a predetermined frequency and transforming the excitation signal from a time domain into a frequency domain, if the low frequency signal is to be encoded in the time domain;

extracting an excitation spectrum from the low frequency signal if the low frequency signal is to be encoded in the frequency domain;

generating a spectrum in a frequency band greater than a predetermined frequency by using a spectrum of the transformed excitation signal or the extracted excitation spectrum; and calculating a gain by using the generated spectrum and a spectrum of a high frequency signal corresponding to a frequency band greater than a predetermined frequency.

38. A non-transitory computer readable medium having computer-readable codes recorded thereon as a computer program to execute a bandwidth extension encoding method comprising:

extracting an excitation spectrum for a low frequency signal corresponding to a frequency band lower than a predetermined frequency;

generating a spectrum in a frequency band higher than the predetermined frequency by using the extracted excitation spectrum; and calculating a gain by using the generated spectrum and a spectrum of a high frequency signal corresponding to a frequency band greater than a predetermined frequency.

39. A non-transitory computer readable medium having computer-readable codes recorded thereon as a computer program to execute a bandwidth extension decoding method comprising:

decoding an excitation signal for a low frequency signal corresponding to a frequency band lower than a predetermined frequency and transforming the excitation signal from a time domain into a frequency domain, if the low frequency signal has been encoded in the time domain;

generating an excitation spectrum for the low frequency signal if the low frequency signal has been encoded in the frequency domain;

generating a spectrum in a frequency band higher than a predetermined frequency by using a spectrum of the transformed excitation signal or the generated excitation spectrum; and decoding a gain and applying the decoded gain to the generated spectrum.

40. An apparatus to encode bandwidth extension, the apparatus comprising:

a spectrum extraction unit to generate an excitation spectrum for a signal in a first frequency band having a frequency that is less than a predetermined frequency; and a spectrum generation unit to generate a spectrum in a second frequency band that is greater than the predetermined frequency with the extracted excitation spectrum.

41. A method of encoding a bandwidth extension, the method comprising:

generating an excitation spectrum with a spectrum extraction unit for a signal in a first frequency band having a frequency that is less than a predetermined frequency; and generating a spectrum with a spectrum generation unit in a second frequency band that is greater than the predetermined frequency with the extracted excitation spectrum.

* * * * *